US009131207B2

(12) United States Patent
Takagi et al.

(10) Patent No.: US 9,131,207 B2
(45) Date of Patent: Sep. 8, 2015

(54) VIDEO RECORDING APPARATUS, INFORMATION PROCESSING SYSTEM, INFORMATION PROCESSING METHOD, AND RECORDING MEDIUM

(71) Applicant: Sony Corporation, Tokyo (JP)

(72) Inventors: Tsuyoshi Takagi, Kanagawa (JP); Noboru Murabayashi, Saitama (JP)

(73) Assignee: Sony Corporation (JP)

( * ) Notice: Subject to any disclaimer, the term of this patent is extended or adjusted under 35 U.S.C. 154(b) by 137 days.

(21) Appl. No.: 13/920,397

(22) Filed: Jun. 18, 2013

(65) Prior Publication Data

US 2014/0010518 A1    Jan. 9, 2014

(30) Foreign Application Priority Data

Jun. 25, 2012   (JP) ................. 2012-141596

(51) Int. Cl.
*H04N 9/82*  (2006.01)
*H04N 5/91*  (2006.01)
*H04N 5/77*  (2006.01)
*H04N 9/806* (2006.01)
*H04N 9/87*  (2006.01)

(52) U.S. Cl.
CPC . *H04N 5/91* (2013.01); *H04N 5/77* (2013.01); *H04N 9/806* (2013.01); *H04N 9/8211* (2013.01); *H04N 9/8715* (2013.01)

(58) Field of Classification Search
CPC .................................... H04N 9/8233

USPC ................................... 386/241, 245
See application file for complete search history.

(56) References Cited

U.S. PATENT DOCUMENTS 8,209,348 B2    6/2012 Takagi
2008/0270138 A1*  10/2008 Knight et al. ................. 704/260
2011/0173100 A1*  7/2011  Boncyk et al. ............... 705/27.1

FOREIGN PATENT DOCUMENTS

JP     2008-219342 A    9/2008

* cited by examiner

*Primary Examiner* — Thai Tran
*Assistant Examiner* — Girumsew Wendmagegn
(74) *Attorney, Agent, or Firm* — Lerner, David, Littenberg, Krumholz & Mentlik, LLP

(57) ABSTRACT

There is provided a video recording apparatus including a content accumulation part accumulating video content, a feature extraction processing part extracting an image or voice as a feature from the video content accumulated by the content accumulation part, and obtaining word information from the extracted image or the extracted voice, a word information acquisition part acquiring sorted word information obtained using clustering processing on word information identified from an image captured by a camera, and a content retrieval part retrieving relevant video content from the video content accumulated by the content accumulation part based on the sorted word information acquired by the word information acquisition part and the word information acquired by the feature extraction processing part.

9 Claims, 13 Drawing Sheets

FIG. 8

| | CONFECTIONERY | AREA | SIMILARITY |
|---|---|---|---|
| INFORMATION MAGAZINE | 3 (NUMBER OF TIMES OF APPEARANCE) | 1 (NUMBER OF TIMES OF APPEARANCE) | |
| SCENE1 | 0 | 0 | 0 |
| SCENE2 | 3 | 3 | 0.89 |
| SCENE3 | 0 | 0 | 0 |
| SCENE4 | 0 | 0 | 0 |

$$\frac{3 \times 3 + 1 \times 3}{\sqrt{3*3+1*1} \ \sqrt{3*3+3*3}} \cong \frac{12}{\sqrt{180}}$$

VIDEO RECORDING APPARATUS, INFORMATION PROCESSING SYSTEM, INFORMATION PROCESSING METHOD, AND RECORDING MEDIUM

CROSS-REFERENCE TO RELATED APPLICATION

The present application claims priority from Japanese Patent Application No. JP 2012-141596 filed in the Japanese Patent Office on Jun. 25, 2012, the entire content of which is incorporated herein by reference.

BACKGROUND

The present disclosure relates to a video recording apparatus, an information processing system, an information processing method, and a recording medium for performing processing utilizing accumulated video content.

Video recording apparatuses accumulating video content such as broadcasting programs are being developed and supplied for practical applications. For example, various kinds of video recording apparatuses using a hard disk drive as a recording medium are being in production. This type of video recording apparatuses tend to have an increasing capacity in which video content can be accumulated along with a larger capacity of the hard disk drive in recent years. For example, a video recording apparatus including a hard disk drive with a capacity of 2 TBytes can accumulate video content with duration of over a thousand hours.

This type of video recording apparatuses have functions of holding information such as titles and dates and times of recording of recorded video content and displaying a title list. Then, the user looks through the title list and picks up content to view from the title list, the content, which is accumulated by the video recording apparatus, played back.

Japanese Patent Laid-Open No. 2008-219342 (hereinafter referred to as Patent Literature 1) discloses a technique of extracting text information such as telops in content accumulated by a video recording apparatus, and in addition, acquiring keywords externally distributed. Moreover, Patent Literature 1 discloses a technique of calculating importance of the keywords thus acquired and searching for content in whose text information a keyword of importance is contained from the content accumulated by the video recording apparatus.

As disclosed in this Patent Literature 1, a video recording apparatus acquiring keywords externally distributed enables, for example, to automatically search for content involving recent topics to present it to the user using the video recording apparatus.

SUMMARY

Incidentally, the presentation of content as disclosed in Patent Literature 1 depends on the retrieval based on keywords externally distributed. Therefore, the video recording apparatus does not always find the content that the user wants to view. Namely, the keywords externally distributed are supposed to be keywords representing the current fashion such as persons' names in recent topics and events' names recently held. Therefore, the presentation of content disclosed in Patent Literature 1 can be suitable, for example, for picking up scenes of topics from video content of news, but can give no retrieval target from content itself at all depending on a kind of the video content.

It is desirable to provide a video recording apparatus, an information processing system, an information processing method and a recording medium for enabling appropriately to perform retrieval of content accumulated by the video recording apparatus.

According to an embodiment of the present disclosure, there is provided a video recording apparatus including: a content accumulation part accumulating video content; a feature extraction processing part; a word information acquisition part; and a content retrieval part.

The feature extraction processing part obtains an image or voice as a feature from the video content accumulated by the content accumulation part, and obtaining word information from the extracted image or the extracted voice.

The word information acquisition part acquires sorted word information obtained using clustering processing on word information identified from an image captured by a camera.

The content retrieval part retrieves relevant video content from the video content accumulated by the content accumulation part on the basis of the sorted word information acquired by the word information acquisition part and the word information acquired by the feature extraction processing part.

According to an embodiment of the present disclosure, there is provided an information processing system including: a camera-equipped terminal apparatus having a camera part; and a video content recording apparatus communicative with the camera-equipped terminal apparatus and having a content accumulation part accumulating video content.

Any one of the camera-equipped terminal apparatus and the video content recording apparatus includes: an image recognition part; a clustering processing part; a feature extraction processing part; and a content retrieval part.

The image recognition part obtains word information from an image captured by the camera part of the camera-equipped terminal apparatus.

The clustering processing part obtains sorted word information by clustering the word information obtained by the image recognition part.

The feature extraction processing part extracts an image or voice as a feature from the video content accumulated by the content accumulation part, and obtaining word information from the extracted image or the extracted voice.

The content retrieval part retrieves relevant video content from the video content accumulated by the content accumulation part on the basis of the sorted word information obtained by the clustering processing part and the word information obtained by the feature extraction processing part.

According to an embodiment of the present disclosure, in an information processing method, feature extraction processing of extracting an image or voice as a feature from video content accumulated by a content accumulation part, and obtaining word information from the extracted image or the extracted voice is performed. Moreover, image recognition processing of obtaining word information from an image captured by a camera is performed, and clustering processing of obtaining sorted word information by clustering the word information obtained using the image recognition processing is performed. Furthermore, content retrieval processing of retrieving relevant video content from the video content accumulated by the content accumulation part on the basis of the sorted word information obtained using the clustering processing and the word information obtained using the feature extraction processing is performed.

According to an embodiment of the present disclosure, there is provided a recording medium being a recording medium in which a program is recorded for causing a computer to execute the following procedures (a) to (d):

(a) a feature extraction procedure of extracting an image or voice as a feature from video content accumulated by a content accumulation part, and obtaining word information from the extracted image or the extracted voice;

(b) an image recognition procedure of obtaining word information from an image captured by a camera;

(c) a clustering procedure of obtaining sorted word information by clustering the word information obtained using the image recognition procedure; and (d) a content retrieval procedure of retrieving relevant video content from the video content accumulated by the content accumulation part on the basis of the sorted word information obtained using the clustering procedure and the word information obtained using the feature extraction procedure.

According to an embodiment of the present disclosure, the retrieval of the video content accumulated by the content accumulation part is performed on the basis of the results obtained by clustering the word information obtained from the image captured by the camera and the word information obtained from the accumulated video content. Hence, an apparatus including the content accumulation part can retrieve video content relevant to the content of an image captured by a camera from the accumulated video content to present to the user.

According to an embodiment of the present disclosure, an apparatus including the content accumulation part can retrieve video content relevant to the content of an image captured by a camera from the accumulated video content to present to the user. Therefore, only the user simply capturing imagery of its interest using the camera-equipped terminal apparatus enables the apparatus including the content accumulation part automatically to present video content relevant to various kinds of information indicated by the imagery to the user.

BRIEF DESCRIPTION OF THE DRAWINGS

FIG. 8 is an explanatory drawing of illustrating an example of determination of similarity according to the embodiment of the present disclosure;

DETAILED DESCRIPTION OF THE EMBODIMENT(S)

Figure 1:
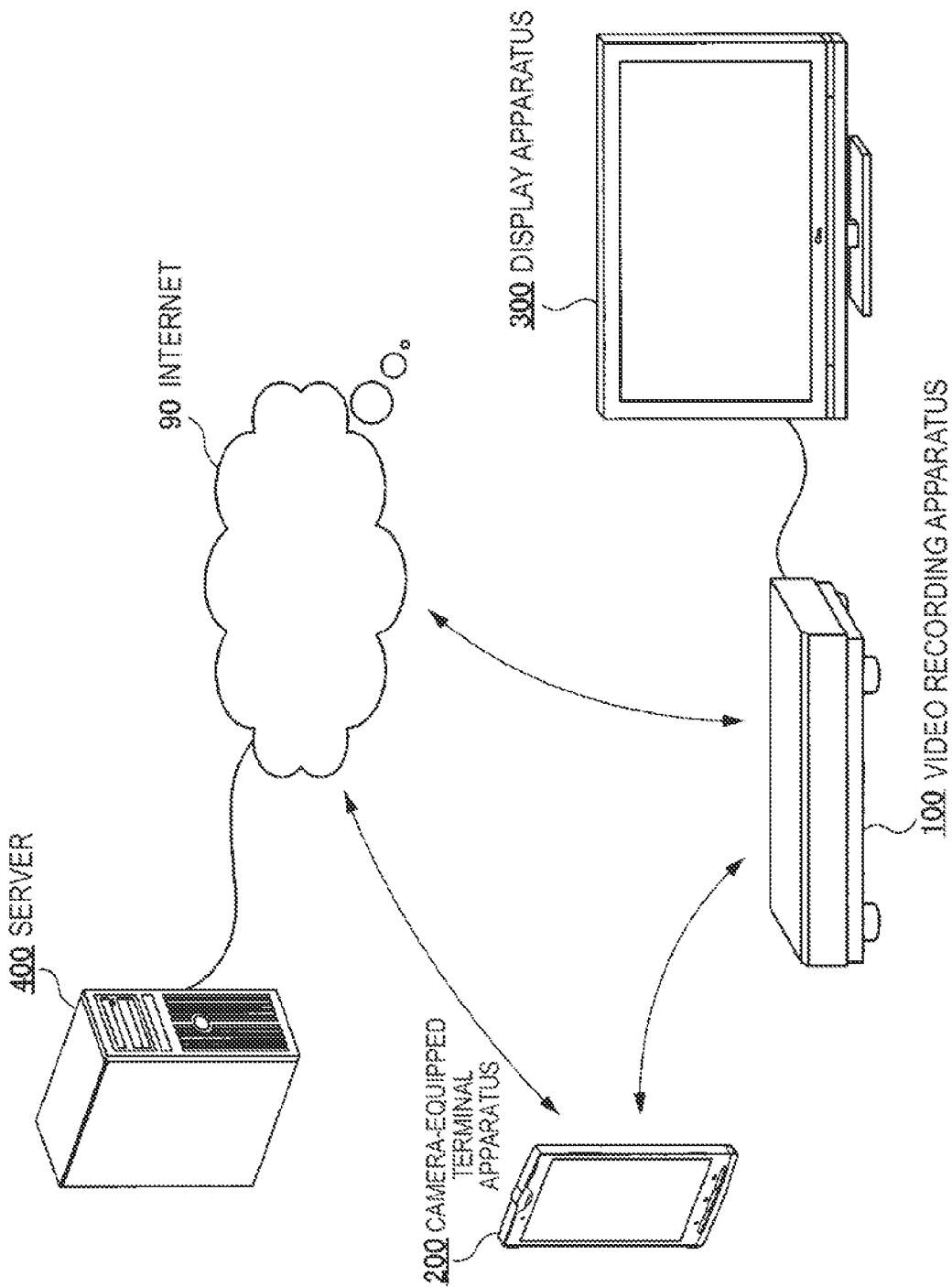
FIG. 1 is an explanatory drawing of an exemplary configuration of a system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A video recording apparatus, an information processing system, an information processing method, and a recording medium according to an embodiment of the present disclosure will be described in the following order with reference to the drawings.

1. Configuration Example of Whole System (FIG. 1)
2. Configuration Example of Video Recording Apparatus (FIG. 2)
3. Configuration Example of Camera-Equipped Terminal Apparatus (FIG. 3)
4. Example of Flow of Processing (FIG. 4 to FIG. 8)
5. Variation 1 (FIG. 9 to FIG. 11)
6. Variation 2 (FIG. 12 to FIG. 13)
7. Other Variations

[1. Configuration Example of Whole System]

FIG. 1 illustrates a diagram illustrating an example of a whole information processing system according to an embodiment of the present disclosure.

The information processing system according to an embodiment of the present disclosure includes a video recording apparatus 100 accumulating video content and a display apparatus 300 displaying the video content accumulated by the video recording apparatus 100. The video recording apparatus 100 includes a large capacity recording medium and accumulates a large amount of video content (broadcasting programs, movies, moving images acquired from moving image sites, and the like). The video recording apparatus 100 and display apparatus 300 may be integrated into one.

The video recording apparatus 100 can connect to a camera-equipped terminal apparatus 200 in a wired or wireless manner. The camera-equipped terminal apparatus 200 employs, for example, a mobile phone terminal device called smart phone. The user captures images of books (magazines), brochures, notices, exhibits and the like of its interest using a camera function implemented in the camera-equipped terminal apparatus 200. Then, the camera-equipped terminal apparatus 200 analyzes the image obtained by the image capturing to acquire word information, and transmits the word information thus acquired to the video recording apparatus 100. In addition, the word information herein contains information regarding a class into which the word is classified as well as information of the word itself (text data).

On the other hand, the video recording apparatus 100 performs feature extraction processing of content using which processing word information is obtained from an image or voice as a feature which is from the accumulated video content. Then, the video recording apparatus 100 compares the word information transmitted from the camera-equipped terminal apparatus 200 with the word information obtained using the feature extraction processing to calculate similarity. Furthermore, the video recording apparatus 100 picks up titles recommended for the user viewing from pieces of video content accumulated by the video recording apparatus 100, on the basis of the similarity thus calculated, and creates a title list including the titles thus picked up. The title list created by the video recording apparatus 100 is displayed on the display apparatus 300.

In addition, the processing is presented as one example in which the camera-equipped terminal apparatus 200 acquires word information from an image. For example, the video recording apparatus 100 may perform processing of acquiring the word information from an image transmitted from the camera-equipped terminal apparatus 200. Or, when the video recording apparatus 100 or the camera-equipped terminal apparatus 200 can connect to the Internet 90, a server 400 connected to the Internet 90 may analyze the image to acquire the word information. Moreover, even when the video recording apparatus 100 or the camera-equipped terminal apparatus 200 performs the analysis, the video recording apparatus 100 or the camera-equipped terminal apparatus 200 may acquire information for the analysis from the server 400.

[2. Configuration Example of Video Recording Apparatus]

Figure 2:
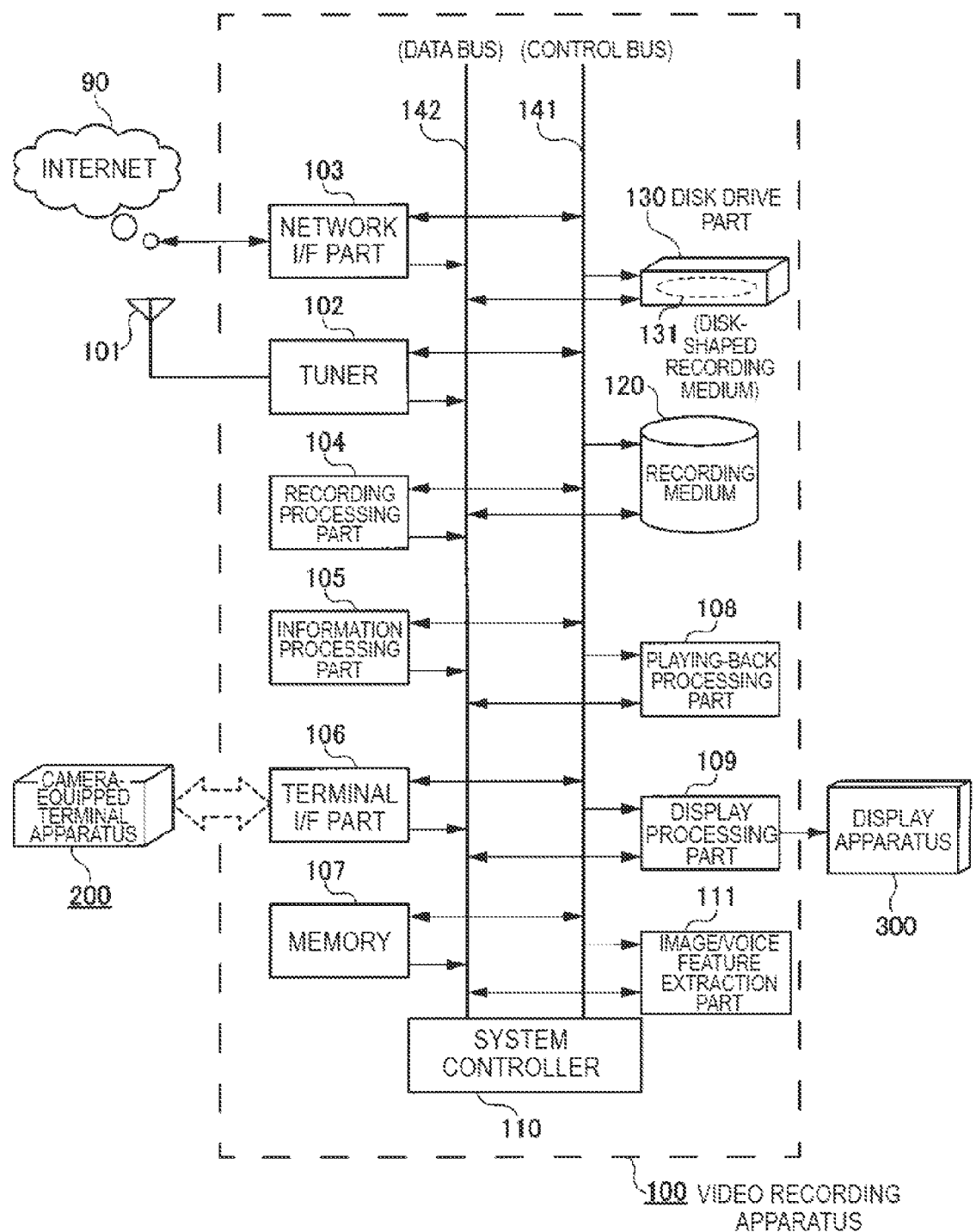
FIG. 2 is a block diagram illustrating an exemplary configuration of a video recording apparatus according to the embodiment of the present disclosure.

FIG. 2 is a diagram illustrating an exemplary configuration of the video recording apparatus 100. The video recording apparatus 100 includes a tuner 102 connected to an antenna 101. The tuner 102 receives a television broadcasting signal. The television broadcasting signal obtained by the tuner 102 receiving is supplied to a recording processing part 104. The signal having undergone processing for recording in the recording processing part 104 is recorded as video content in a recording medium 120. The recording medium 120 employs a hard disk drive, a flash memory and the like. The video content recorded in the recording medium 120 includes, for example, broadcasting programs obtained by the user having performed video recording reservation, broadcasting programs obtained by having been retrieved automatically from a program table and the like under the preset conditions, and the like. Or, when the recording medium 120 has an exceedingly large capacity, broadcasting programs on designated channels may be being recorded at all times.

Moreover, the video recording apparatus 100 includes a disk drive part 130 and a disk-shaped recording medium 131 mounted in the disk drive part 130 can also record the video content.

Moreover, the video recording apparatus 100 includes a network interface part 103 and can connect to the Internet 90 via a predetermined network. The recording medium 120 or the disk-shaped recording medium 131 records video content which the network interface part 103 receives from the outside.

In addition, the recording medium 120 contains a database in which data as analysis results of the video content thus recorded is recorded. An image/voice feature extraction part 111 performs processing of analysis of the video content under the control of a system controller 110.

Moreover, a playing-back processing part 108 performs playing-back processing on the video content recorded in the recording medium 120 to obtain image data and voice data. The image data and voice data obtained using the playing-back processing are supplied to the display apparatus 300, which is externally provided, via a display processing part 109. The display apparatus 300 displays an image based on the image data thus supplied on a display panel. Voice based on the voice data thus supplied is outputted from a loud speaker. Moreover, when an information processing part 105 performs processing of creating a content list and the like, the display processing part 109 creates image data used for displaying the content list and the like to supply the image data thus created to the display apparatus 300.

Moreover, the video recording apparatus 100 can perform data transfer with the camera-equipped terminal apparatus 200 via a terminal interface part 106. The terminal interface part 106 can perform connection and data transfer with the camera-equipped terminal apparatus 200 in a manner of communication with wiring cables or in a wireless communication manner. In the example according to the present disclosure, the camera-equipped terminal apparatus 200 transmits word information to the video recording apparatus 100. Accordingly, the terminal interface part 106 functions as a word information acquisition part which acquires word information from the camera-equipped terminal apparatus 200.

In addition, when performing data transfer between the camera-equipped terminal apparatus 200 and video recording apparatus 100, the network interface part 103 may perform it via the Internet 90.

The image/voice feature extraction part 111 extracts a feature from an image, voice and the like of video content recorded in the recording medium 120 to acquire words from the feature thus extracted. Then, the image/voice feature extraction part 111 forms the words thus acquired into word information obtained by classification thereof, and forms the word information into a database to record in the recording medium 120.

The information processing part 105 compares the word information of each piece of video content recorded in the recording medium 120 as the database with the word information transmitted from the camera-equipped terminal apparatus 200 to perform processing of retrieving the video content with high similarity. Then, the information processing part 105 creates a content list indicating whole content recommended for the user playing back on the basis of the retrieval results. Or, the system controller 110 may acquire the retrieval results of the information processing part 105, and the system controller 110 may automatically play back the video content with the highest similarity.

In addition, the individual processing parts in the video recording apparatus 100 conduct transmission and reception of control commands with the system controller 110 via a control bus 141 and data transfer via a data bus 142. The control bus 141 and data bus 142 connect to a memory 107 and the memory 107 temporarily stores data when the system controller 110 and the like performs processing. Moreover, the memory 107 stores a program which the system controller 110 executes. Then, upon turning on the video recording apparatus 100 and the like, the system controller 110 executes the program stored in the memory 107, and thereby, the video recording apparatus 100 operates as instructed by the program. Also the retrieval processing of video content described in the examples according to the embodiment is performed by the system controller 110 executing the program stored in the memory 107.

[3. Configuration Example of Camera-Equipped Terminal Apparatus]

Figure 3:
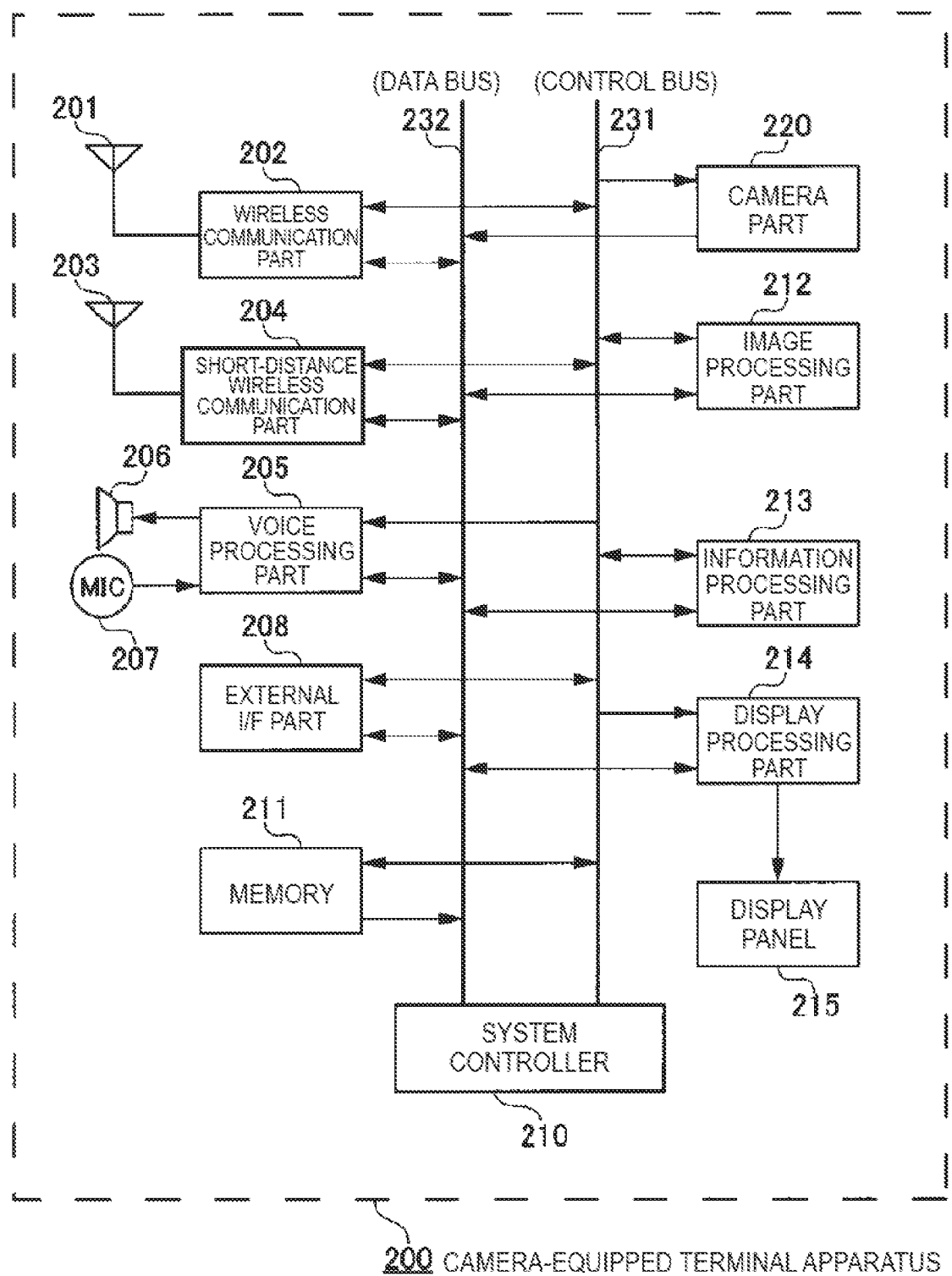
FIG. 3 is a block diagram illustrating an exemplary configuration of a camera-equipped terminal apparatus according to the embodiment of the present disclosure.

FIG. 3 is a diagram illustrating an exemplary configuration of the camera-equipped terminal apparatus 200. The camera-equipped terminal apparatus 200 according to an embodiment of the present disclosure is an example of application to a mobile phone terminal device called smart phone.

The camera-equipped terminal apparatus 200 includes a wireless communication part 202 connected to an antenna 201. The wireless communication part 202 performs processing of transmission and reception of wireless signals with base stations for radiotelephony under the control of a system controller 210. The system controller 210 performs transfer of commands, data and the like to the individual parts in the camera-equipped terminal apparatus 200 via a control bus 231 and a data bus 232.

A memory 211 stores beforehand prepared data such as a program, and in addition, stores data generated by user operation. The data thus generated by user operation includes image data of images captured by the camera part 220 and word information obtained by analyzing the image data.

When the camera-equipped terminal apparatus 200 performs voice call, voice data for calling received by the wireless communication part 202 is supplied to a voice processing part 205. The voice processing part 205 performs decoding processing on the voice data thus supplied and obtains an analog voice signal. The analog voice signal obtained by the voice processing part 205 is supplied to a loud speaker 206 and the voice is outputted from the loud speaker 206.

Moreover, during the voice call, the voice processing part 205 converts a voice signal outputted by a microphone 207 into voice data in a transmission format. Then, the voice data converted by the voice processing part 205 is supplied to the wireless communication part 202, and the voice data supplied to the wireless communication part 202 is formed into a packet and transmitted from the antenna 201 in a wireless manner.

When the camera-equipped terminal apparatus 200 performs data communication and/or transmission and reception of mail via a network such as the Internet, the wireless communication part 202 performs processing of the transmission and reception under the control of the system controller 210. For example, data received by the wireless communication part 202 is stored in the memory 211 and processing such as display based on the stored data is performed according to the control of the system controller 210. Moreover, data stored in the memory 211 is supplied to the wireless communication part 202 and transmitted in a wireless manner.

Moreover, the camera-equipped terminal apparatus 200 includes a display processing part 214 and a display panel 215 performing display according to the drive by the display processing part 214. The display panel 215 is integrated with a touch panel. Moreover, the camera-equipped terminal apparatus 200 includes an external interface part 208 and can perform data transfer with external equipment such as the video recording apparatus 100.

Furthermore, the camera-equipped terminal apparatus 200 includes a camera part 220. The camera part 220 captures still images or moving images according to user's operation.

Image data obtained by the camera part 220 capturing imagery is stored in the memory 211. In this case, the camera-equipped terminal apparatus 200 includes an image processing part 212 performing various kinds of processing on the image data thus obtained by the image capturing, and the image data processed by the image processing part 212 is stored in the memory 211. The image processing part 212 also performs image analysis processing mentioned later. When the image data analyzed by the image processing part 212 is image data with voice data, such as moving image data, the image processing part 212 also analyzes the voice data.

When the image processing part 212 analyzes the image and/or the voice, information of the analysis results is supplied to an information processing part 213. The information processing part 213 acquires word information relevant to the image and/or the voice from the analysis results of the image and/or the voice under the control of the system controller 210. Moreover, the information processing part 213 performs clustering processing of sorting the word information thus acquired. The word information having undergone the clustering processing is stored in the memory 211. The word information stored in the memory 211 which information has undergone the clustering processing is transmitted to the video recording apparatus 100 under the control of the system controller 210.

In addition, the camera-equipped terminal apparatus 200 includes a short-distance wireless communication part 204 connected to an antenna 203, and wireless communication using the short-distance wireless communication part 204 enables to perform data transfer with neighboring other devices and/or access points. The short-distance wireless communication part 204 communicates in a wireless manner, for example, with a counterpart within a range of tens of meters, for example, using a wireless LAN (local area network) system defined by the IEEE 802.11 standard. The wireless communication using the short-distance wireless communication part 204 is used, for example, in case of the camera-equipped terminal apparatus 200 accessing the Internet.

Moreover, the wireless communication using the short-distance wireless communication part 204 is used also in case of the camera-equipped terminal apparatus 200 performing data transmission with the video recording apparatus 100. Namely, the camera-equipped terminal apparatus 200 ordinary performs data transmission with the video recording apparatus 100 via the external interface part 208 as mentioned above, whereas the short-distance wireless communication part 204 communicates in a wireless manner with the video recording apparatus 100 when the data transmission through a path via the external interface part 208 is failed.

[4. Example of Flow of Processing]

Next, processing performed in the system according to an embodiment of the present disclosure is described with reference to FIG. 4 to FIG. 8. In addition, allocation of the apparatuses performing the individual pieces of processing described below is one example and other apparatuses in the system, a server on the Internet, and the like may perform the individual pieces of processing.

Figure 4:
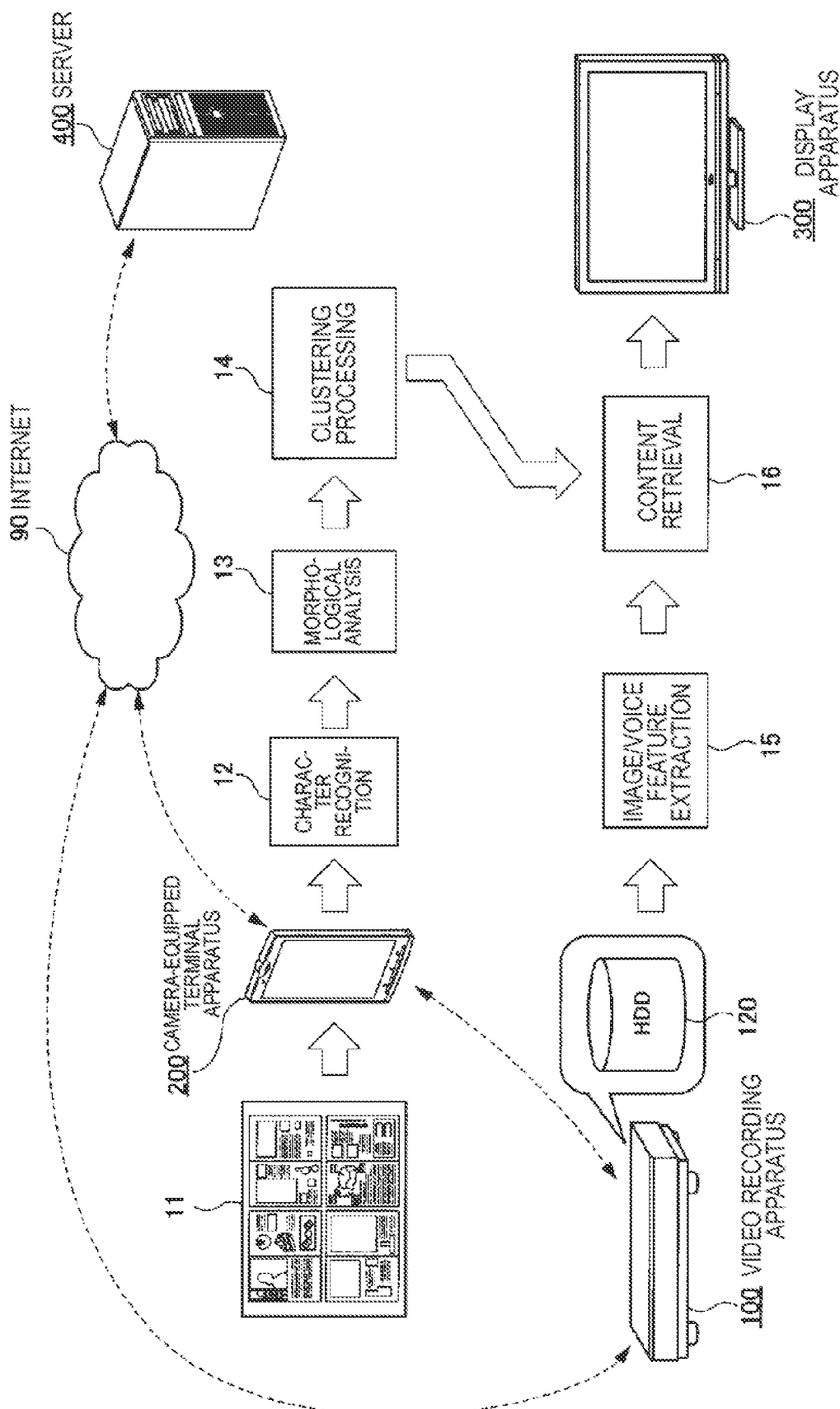
FIG. 4 is an explanatory drawing of illustrating an example of an outline of processing according to the embodiment of the present disclosure.

FIG. 4 is a diagram illustrating summary of the processing. For example, when the user who holds the camera-equipped terminal apparatus 200 find books, magazines or the like in which favorite information is described in characters, it captures imagery of the relevant pages in the books, magazines or the like using the camera part 220 of the camera-equipped terminal apparatus 200 to obtain an image 11. The image is preferable to be a still image but may be a moving image. The target for the image capturing may be anything such as magazines and brochures in which information of the user's favorite and/or information of its interest are described. Moreover, other than the printed matter such as the books and magazines, the user may capture imagery of various things of its interest such as notices and exhibits.

Then, the camera-equipped terminal apparatus 200 performs character recognition processing 12 on the image obtained by the camera part 220 capturing the imagery. The character recognition processing 12 is performed by the image processing part 212 of the camera-equipped terminal apparatus 200. Performing the character recognition processing 12 forms characters in the image 11 into text data. For example, when the image 11 is obtained by capturing imagery of a specific page in a book, the character recognition processing 12 forms characters described in the relevant page in the book into text data.

Next, the information processing part 213 in the camera-equipped terminal apparatus 200 performs morphological analysis processing 13 on the text data obtained using the character recognition processing 12, The morphological analysis processing is processing of extracting words from the text data. Furthermore, the information processing part 213 in the camera-equipped terminal apparatus 200 performs clustering processing 14 of sorting the words extracted from the text data by kinds. In this case, information regarding classes into which the sorting is performed using the clustering processing 14 is acquired, for example, from the server 400. After that, the camera-equipped terminal apparatus 200 transmits word information obtained using the clustering processing 14 to the video recording apparatus 100.

The video recording apparatus 100 analyzes video content accumulated in the recording medium 120. Namely, the video recording apparatus 100 performs image/voice feature extraction processing 15 of extracting features of images and voice of the video content accumulated in the recording medium 120. Herein, the feature extraction processing on images is performed, for example, by forming characters in the images such as subtitles and telops added to the images into text data. The feature extraction processing on voice is performed by forming voice data into text data using voice recognition processing. Moreover, when there is information added to the video content (program guidance information and the like), text data is obtained from the added information. When there is data such as subtitles as other additional data separate from the image data, text data contained in the additional data is taken therefrom. Such taking of the text data is performed by the image/voice feature extraction part 111 of the video recording apparatus 100.

Then, the video recording apparatus 100 takes words from each text data thus obtained and obtains word information for each piece of video content. The acquisition processing of word information from the text data is performed by the information processing part 105 of the video recording apparatus 100. The acquired word information is formed into a database and recorded, for example, in the recording medium 120.

In addition, the analysis processing on the video content accumulated in the recording medium 120 is performed, for example, upon accumulating each piece of video content in the recording medium 120 on a piece-by-piece basis. Or, it may be performed collectively by the video recording apparatus 100 for all the pieces of video content accumulated in the recording medium 120 on the occasion of word information transmitted from the camera-equipped terminal apparatus 200.

Then, the video recording apparatus 100 compares the word information transmitted from the camera-equipped terminal apparatus 200 with the word information obtained from the video content accumulated in the recording medium 120, and performs content retrieval processing 16 of searching for video content as a target on the basis of coincidence and the like. The content retrieval processing 16 is performed by the information processing part 105 of the video recording apparatus 100. The video recording apparatus 100 creates a title list indicating whole pieces of video content obtained by the retrieval, and the display apparatus 300 displays the title list. Then, by the user performing operation of selecting any piece of video content from the title list, the video recording apparatus 100 plays back the relevant video content. The video content thus played back by the video recording apparatus 100 is displayed by the display apparatus 300. Or, the video recording apparatus 100 may automatically play back the video content detected on the basis of coincidence.

Figure 5:
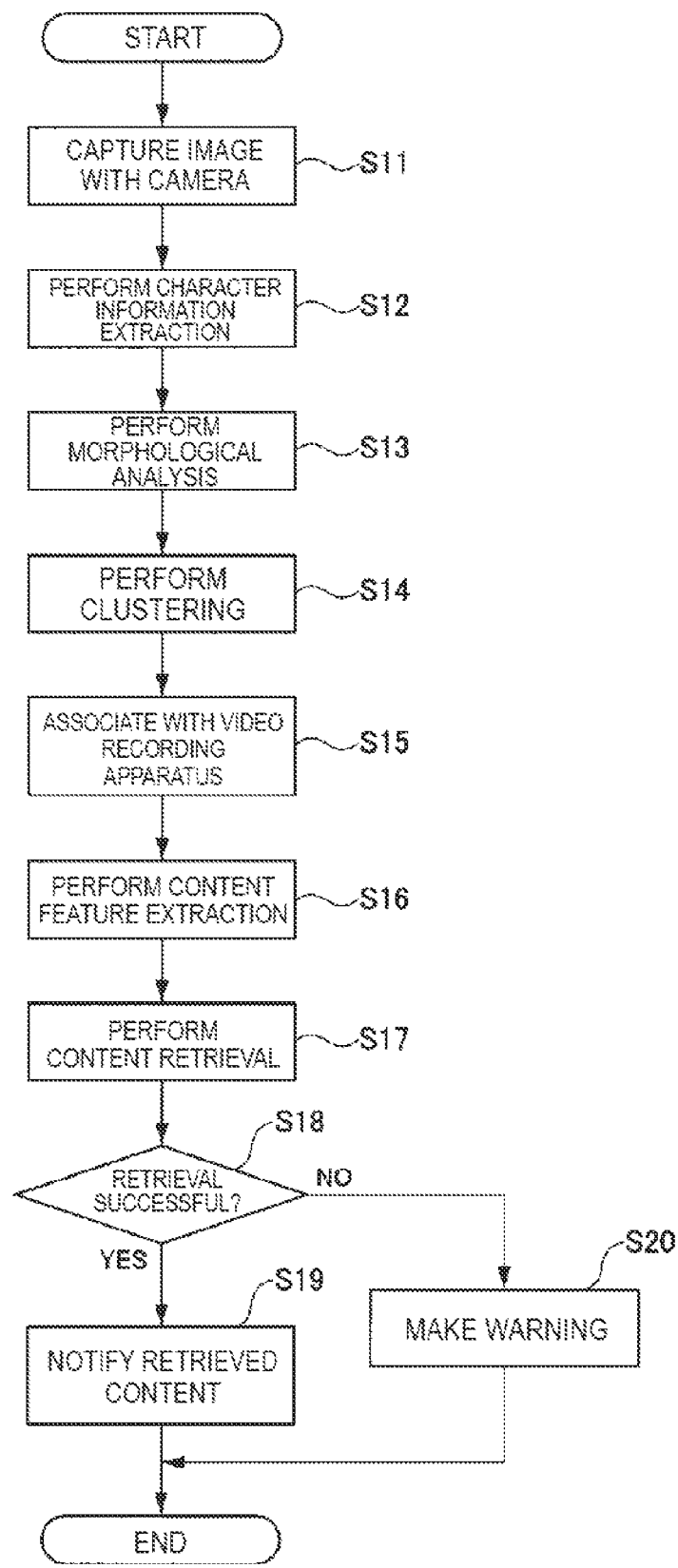
FIG. 5 is a flowchart illustrating an example of processing according to the embodiment of the present disclosure.

FIG. 5 is a flowchart of the processing illustrated in FIG. 4.

Operation illustrated in the flowchart of FIG. 5 is described with reference to specific examples of processing in FIG. 6 to FIG. 8.

First, the user sets the operation mode of the camera-equipped terminal apparatus 200 to an operation mode in which image acquisition is performed for retrieving video content. In the state of the operation mode being set, the user captures an image of a book or the like using the camera-equipped terminal apparatus 200, and acquires the image (a still image or a moving image), in which characters are described (step S11). Upon acquiring the image, the camera-equipped terminal apparatus 200 performs image recognition processing to extract the characters in the image as a text code (step S12).

Then, the camera-equipped terminal apparatus 200 performs morphological analysis on a character string in the text code thus extracted (step S13), and acquires words expected for content retrieval. In the morphological analysis, the character string, which is present in text data, is divided into minimum units each having a meaning (morphemes) and a part of speech for each morpheme is determined. From the morphemes thus determined, the words expected for retrieving video content are extracted. Furthermore, the camera-equipped terminal apparatus 200 performs clustering processing on the words thus extracted (step S14).

Figure 6:
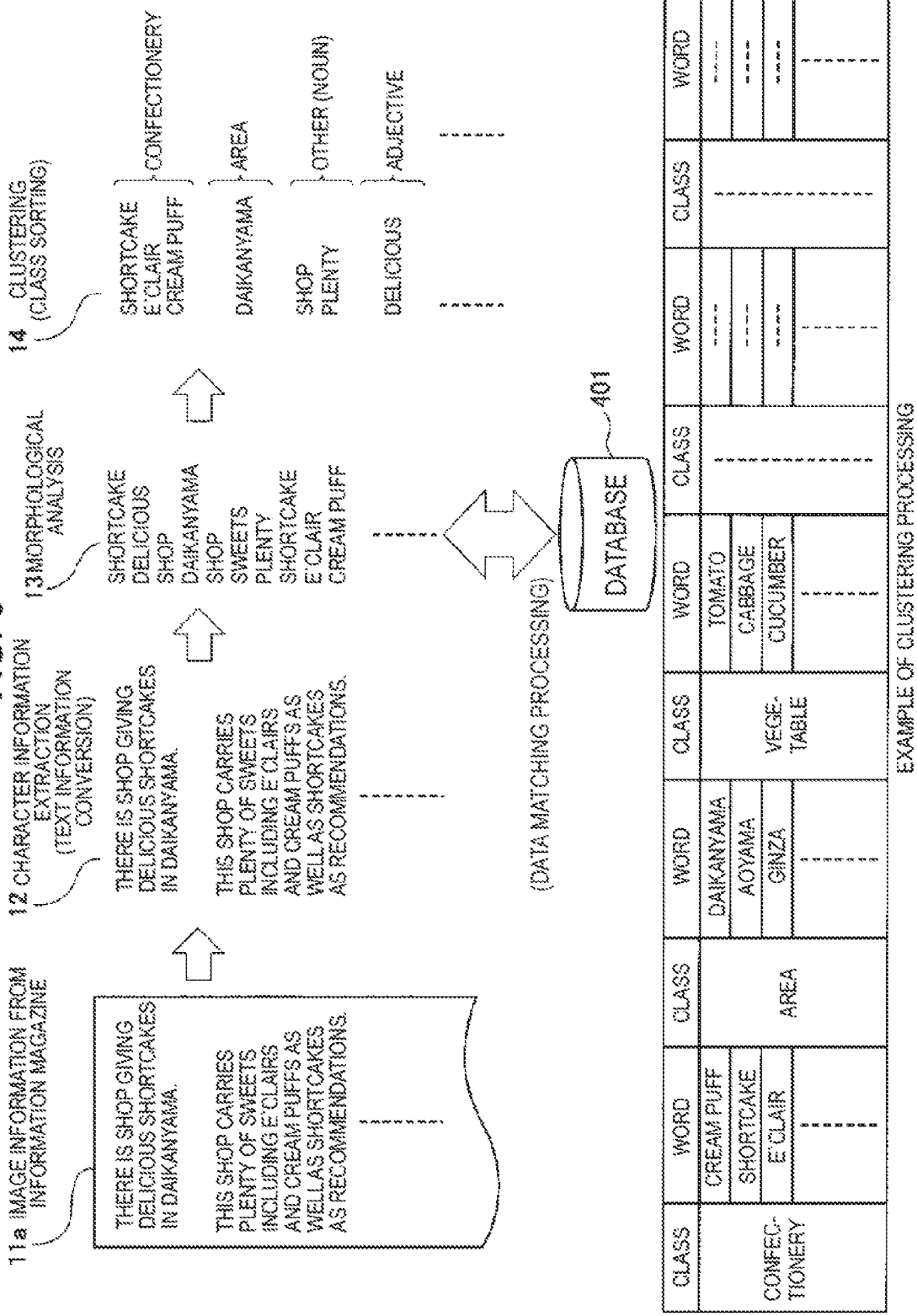
FIG. 6 is an explanatory drawing of illustrating an example of clustering processing according to the embodiment of the present disclosure.

The character extraction processing, morphological analysis processing and clustering processing on the captured image are performed, for example, as illustrated in FIG. 6.

Suppose that the user captures imagery of an information magazine in which guidance information of a shop in style appears. The camera-equipped terminal apparatus 200 obtains an image 11a due to the image capturing. At this stage, the character recognition processing 12 allows to form characters presented in the image 11a into text data.

In the example of FIG. 6, the image 11a is a captured image of a specific page of an information magazine in which the information of a confectionery appears, and the morphological analysis allows to extract words such as names of confectionery, location areas of the confectionery, other nouns, and adjectives.

Then, the clustering processing 14 allows to sort the words thus extracted by classes. For example, the words having undergone the morphological analysis are sorted into a class of name of confectionery, a class of area, a class of other noun, a class of adjective, and the like.

When the camera-equipped terminal apparatus 200 performs the clustering processing 14, the camera-equipped terminal apparatus 200 communicates, for example, with the server 400 illustrated in FIG. 1 to use a database 401 regarding clustering included in the server 400. Namely, the database 401 prepared in the server 400 has information regarding various words and classes to which the words belong. For example, the database 401 illustrated in FIG. 6 has information of words belonging to various classes such as "confectionery", "area" and "vegetable" on a class-by-class basis. For example, as the class "confectionery", words of various names of confectionery such as "cream puff", "shortcake" and "eclair" are stored. Referring to such information in the database 401, the camera-equipped terminal apparatus 200 performs the clustering processing 14. In addition, the camera-equipped terminal apparatus 200 may have the database 401 for the clustering processing.

Returning to the flowchart of FIG. 5, the word information having undergone the clustering is transmitted from the camera-equipped terminal apparatus 200 to the video recording apparatus 100 for the purpose of associating it with the video content accumulated by the video recording apparatus 100

(step S15). At this stage, the word information thus transmitted contains, for example, information of words as illustrated in FIG. 6 and classes to which the individual words belong.

Then, the video recording apparatus 100 performs feature extraction processing on the video content accumulated in the recording medium 120 (step S16). In addition, the feature extraction processing on the video content is performed, as one example, in step S16 in the presented order of steps, whereas the video recording apparatus 100 may perform the feature extraction processing on the video content at any other time point. Moreover, words obtained as the results of the feature extraction processing on the video content undergo clustering processing same as the processing in the camera-equipped terminal apparatus 200 to afford sorted word information.

After that, the video recording apparatus 100 performs content retrieval processing of retrieving relevant video content on the basis of the word information obtained using the feature extraction processing on the video content and the word information transmitted from the camera-equipped terminal apparatus 200 (step S17). For example, the video recording apparatus 100 compares the word information obtained using the feature extraction processing on the video content with the word information transmitted from the camera-equipped terminal apparatus 200 to perform the content retrieval processing using coincidence of the words as the comparison results.

Then, the system controller 110 of the video recording apparatus 100 determines whether or not candidate video content is retrieved from among the video content accumulated in the recording medium 120 using the content retrieval processing (step S18). When the candidate video content is retrieved in the determination, the system controller 110 performs creation instruction of a title list of the content thus retrieved, and notifies the user the retrieved video content (step S19). Then, when no candidate video content is retrieved in the determination in step S18, the system controller 110 makes warning of no similar content on a display image or the like (step S20).

Figure 7:
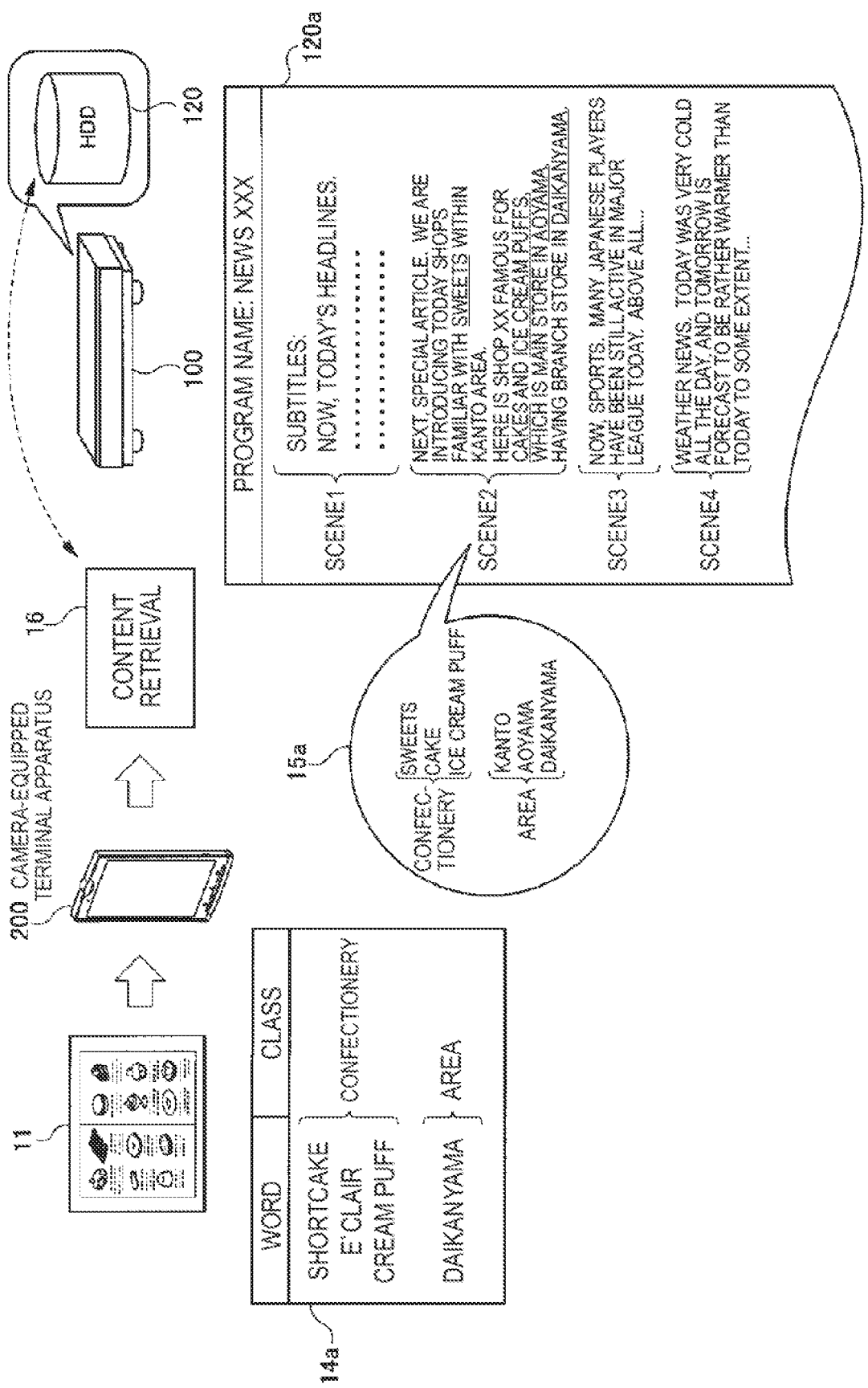
FIG. 7 is an explanatory drawing of illustrating an example of content retrieval processing according to the embodiment of the present disclosure.

FIG. 7 is a diagram illustrating an example in which the video recording apparatus 100 retrieves video content accumulated in the recording medium 120 on the basis of the words obtained by the camera-equipped terminal apparatus 200 from the captured image.

As illustrated in FIG. 7, word information 14a having undergone the clustering processing is transmitted from the camera-equipped terminal apparatus 200 to the video recording apparatus 100. Moreover, the video recording apparatus 100 performs feature extraction on certain video content 120a accumulated in the recording medium 120 to obtain word information 15a. In the example of FIG. 7, the word information 15a obtained by the feature extraction on the video content 120a is for each of scenes into which the video content 120a as one piece is divided, and is information obtained by sorting using clustering processing.

Namely, in the example of FIG. 7, the video content 120a is a news program and the video content 120a is divided into scene 1, scene 2, . . . for individual topics in the news program. Furthermore, for each scene, words detected from the voice are sorted using the clustering processing. For example, in the word information 15a of scene 2, the number of times of appearance of the words in class confectionery is 3 times and the number of times of appearance of the words in class area is 3 times.

Then, the information processing part 105 of the video recording apparatus 100 compares the word information transmitted from the camera-equipped terminal apparatus 200 with the word information obtained using the feature extraction on each piece of the video content. For example, as illustrated in FIG. 7, the information processing part 105 of the video recording apparatus 100 compares the word information 14a obtained from the captured image with the word information (word information 15a or the like) for each scene of the video content 120a to perform content retrieval processing 16. The information processing part 105 of the video recording apparatus 100 performs determination of similarity for each scene (or for each piece of content) according to the number of words in the class of coincidence by the comparison in the content retrieval processing 16, and picks up a scene or content with high similarity obtained by the determination.

FIG. 8 is a diagram illustrating an example of the determination of similarity for each scene.

In this example, two classes "confectionery" and "area" are presented.

For example, as illustrated in FIG. 8, suppose that, in the image acquired by the camera-equipped terminal apparatus 200, the number of times of appearance of words in "confectionery" is 3 times and the number of times of appearance of words in "area" is 1 time. At this stage, the information processing part 105 determines how much number of times words in each of the classes same as those of the words of 3 times appear in each of scenes 1 to 4 in the one piece of video content.

As illustrated in FIG. 8, supposed that, in scene 2, the number of times of appearance of words in "confectionery" is 3 times and the number of times of appearance of words in "area" is 3 times, and that, in other scenes 1, 3 and 4, the numbers of times of appearance of words in "confectionery" and words in "area" is 0 times each.

At this stage, a similarity between the word information obtained from the captured image and the word information obtained from each scene is calculated, for example, according to the following expression.

$$[(x \cdot y)+(a \cdot b)]/[\sqrt{(a^2+b^2)} \cdot \sqrt{(x^2+y^2)}]$$

where a, b, x, and y in the expression are defined as follows.

a: number of times of appearance of words in class "confectionery" obtained from the captured image, b: number of times of appearance of words in class "area" obtained from the captured image, x: number of times of appearance of words in class "confectionery" in each scene, and y: number of times of appearance of words in class "area" in each scene.

By performing the calculation of similarities, the similarity of scene 2 is 0.89 and the similarities of scenes 1, 3, and 4 are 0. The example of calculation illustrated in FIG. 8 presents the calculation of the similarity of scene 2 according to the above-mentioned expression.

The information processing part 105 of the video recording apparatus 100 performs the processing of calculating similarities for all the pieces of video content accumulated in the recording medium 120. Then, the information processing part 105 sets video content with similarity not less than a threshold (or a scene in the video content) to similar content (or a similar scene).

After the completion of the calculation of similarities for all the pieces of content, the system controller 110 of the video recording apparatus 100 instructs creation of a title list of the content or a list of the scenes thus picked up, and the display apparatus 300 displays the list thus created.

Then, the user performs operation of selecting a wanting piece of video content from the list thus displayed. By the user performing the operation, the video recording apparatus 100 plays back the selected piece of video content and the display apparatus 300 displays the piece of video content thus played back.

In addition, the processing is presented as one example in which the video recording apparatus 100 creates a title list on the basis of the retrieval results, and the video recording apparatus 100 may perform other processing. For example, on the basis of the retrieval of content in the video recording apparatus 100, the video recording apparatus 100 may automatically play back video content with the highest similarity.

As described above, on the basis of word information detected from an image captured by the user using the camera-equipped terminal apparatus 200, the video recording apparatus 100 performs retrieval in accumulated video content, this enabling to present video content appropriately. Namely, even when the user does not grasp the contents of accumulated video content at all, the user simply capturing imagery of its interest leads to the video recording apparatus 100 automatically searching for relevant video content. Accordingly, a wider range of enjoying the video recording apparatus 100 can be provided. Moreover, as in the examples illustrated in FIG. 7 and FIG. 8, performing comparison of similarities for each of scenes in one piece of video content enables to find out a scene of the user's interest immediately, even in case where each piece of video content is content with relatively longer duration.

[5. Variation 1]

Next, a variation according to the embodiment of the present disclosure (part 1) is described with reference to FIG. 9 to FIG. 11.

Figure 9:
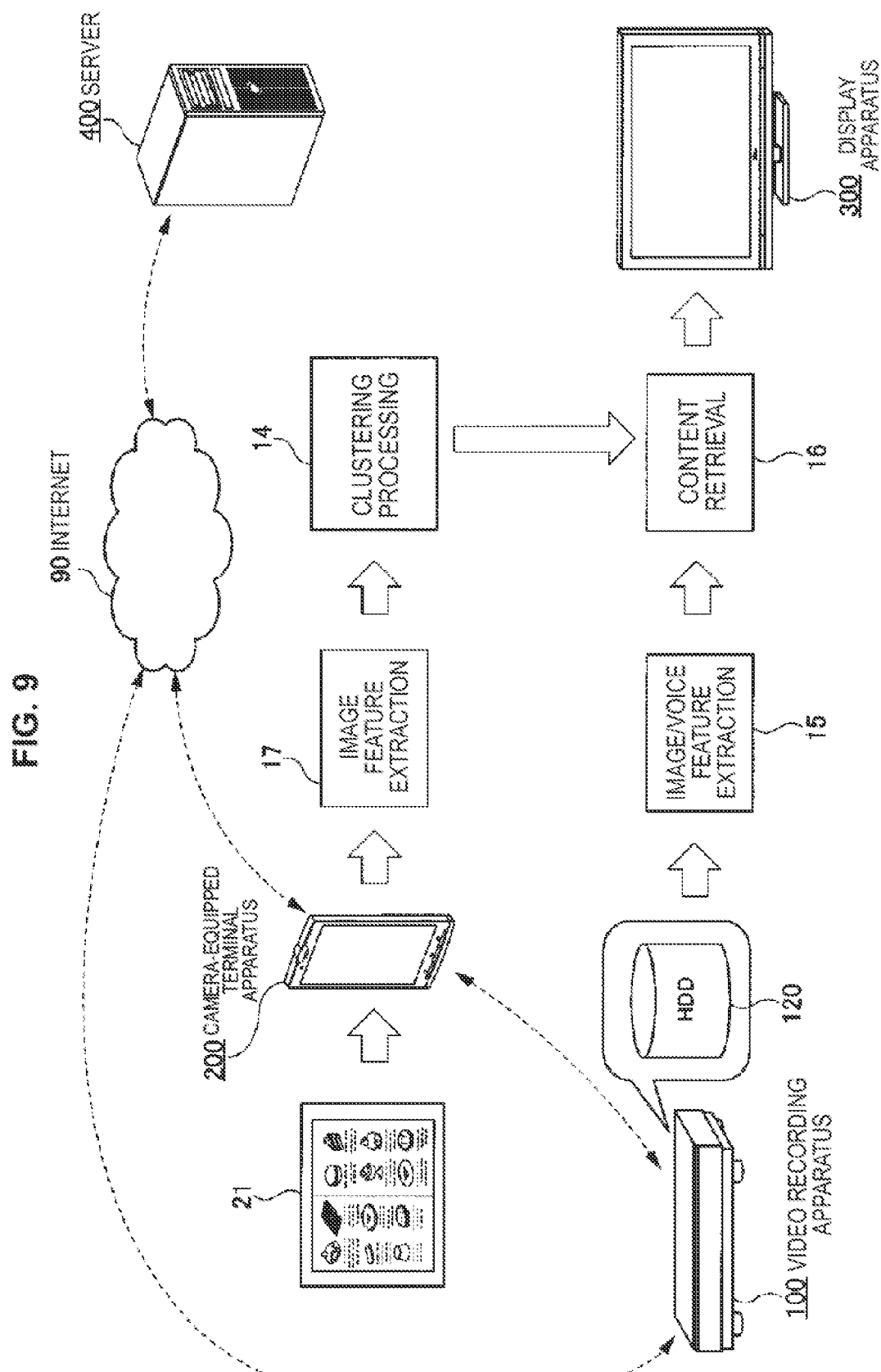
FIG. 9 is an explanatory drawing of illustrating an outline of variation 1 according to the embodiment of the present disclosure (example of extraction of a feature from the content of an image)

FIG. 9 is a diagram illustrating summary of the processing according to this example. As the example according to one embodiment described above, FIG. 4 illustrates an example of character recognition on characters contained in a captured image captured by the camera-equipped terminal apparatus 200. On the contrary, in the example of FIG. 9, the camera-equipped terminal apparatus 200 performs image recognition on a captured image and obtains character information from the recognition results of shapes and colors of object bodies in the image.

For example, as illustrated in FIG. 9, suppose that the camera-equipped terminal apparatus 200 obtains an image 21 obtained by capturing imagery of magazines in which pictures of confectionery are described. At this stage, the image processing part 212 of the camera-equipped terminal apparatus 200 performs image feature extraction processing 17, and thereby, detects names of confectionery appearing in the image and obtains text data of the names of confectionery.

In detecting the names from the image, for example, the image may be sent to the server 400 connected to the Internet 90 and the server 400 may perform retrieval.

Then, the information processing part 213 in the camera-equipped terminal apparatus 200 performs the clustering processing 14 of sorting the words extracted from the text data by kinds. The processing after the clustering processing 14 is same as the processing described with reference to FIG. 4.

In addition, also when the video recording apparatus 100 performs the image/voice feature extraction processing 15 of performing the analysis of video content, the text data may be detected on the basis of the recognition results of the object bodies in the image, same as the image feature extraction processing 17 in the camera-equipped terminal apparatus 200.

Then, the video recording apparatus 100 compares the word information transmitted from the camera-equipped terminal apparatus 200 and the word information obtained from video content accumulated in the recording medium 120 to perform the content retrieval processing 16 of searching for video content as the target. The video recording apparatus 100 creates, for example, a title list of the video content retrieved in the content retrieval processing 16.

Figure 10:
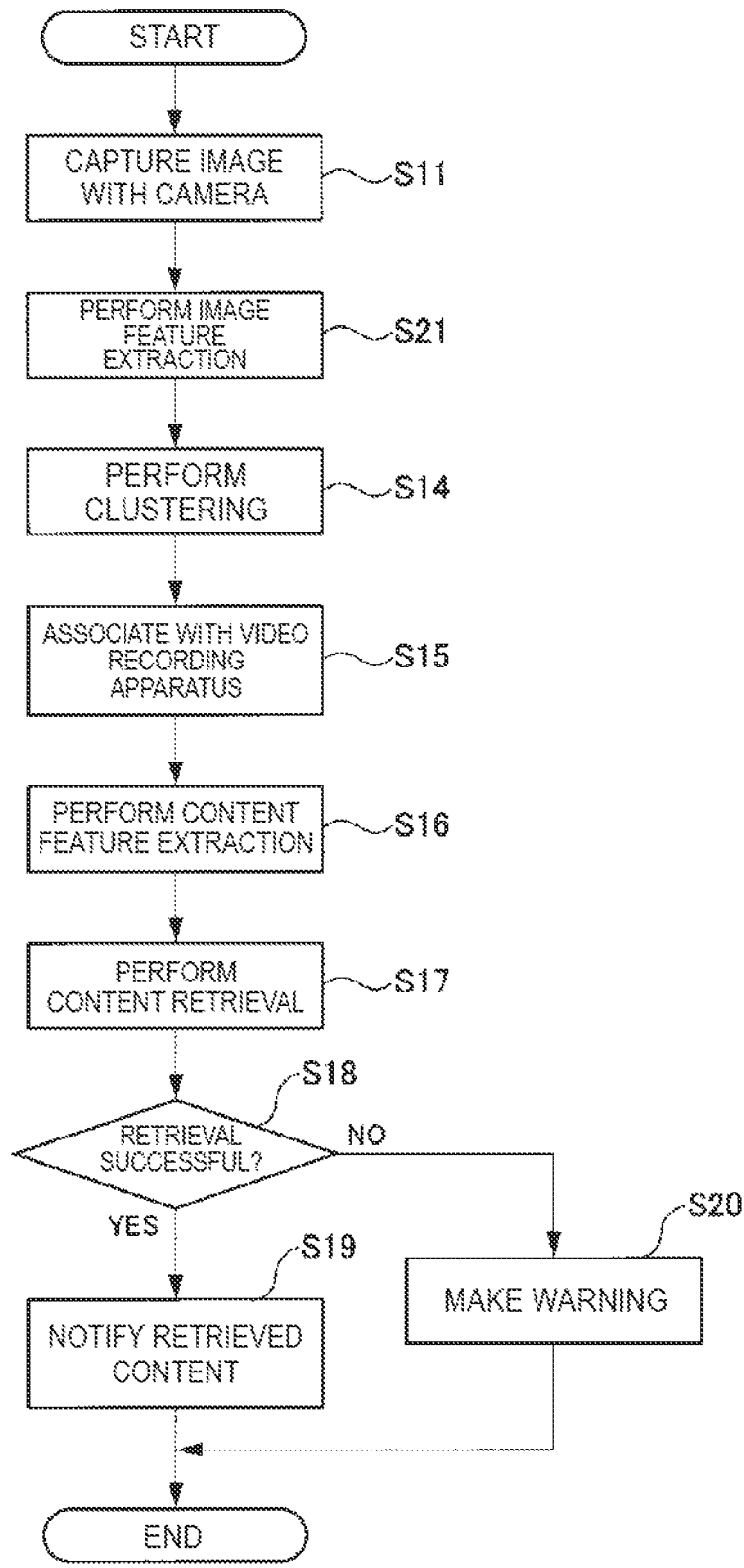
FIG. 10 is a flowchart illustrating processing according to variation 1.

FIG. 10 is a flowchart of the processing illustrated in FIG. 9. In the flowchart of FIG. 9, the pieces of processing same as in the flowchart of FIG. 5 are provided with the same step numbers and their description is omitted.

In the flowchart of FIG. 9, after the camera-equipped terminal apparatus 200 acquires a captured image in step S11, the image feature extraction processing 17 illustrated in FIG. 9 is performed on the image to obtain the word information from shapes and the like of the object bodies in the image (step S21). Then, the camera-equipped terminal apparatus 200 performs the clustering processing on the words thus obtained (step S14). The processing after the clustering processing is same as in the flowchart of FIG. 5.

Figure 11:
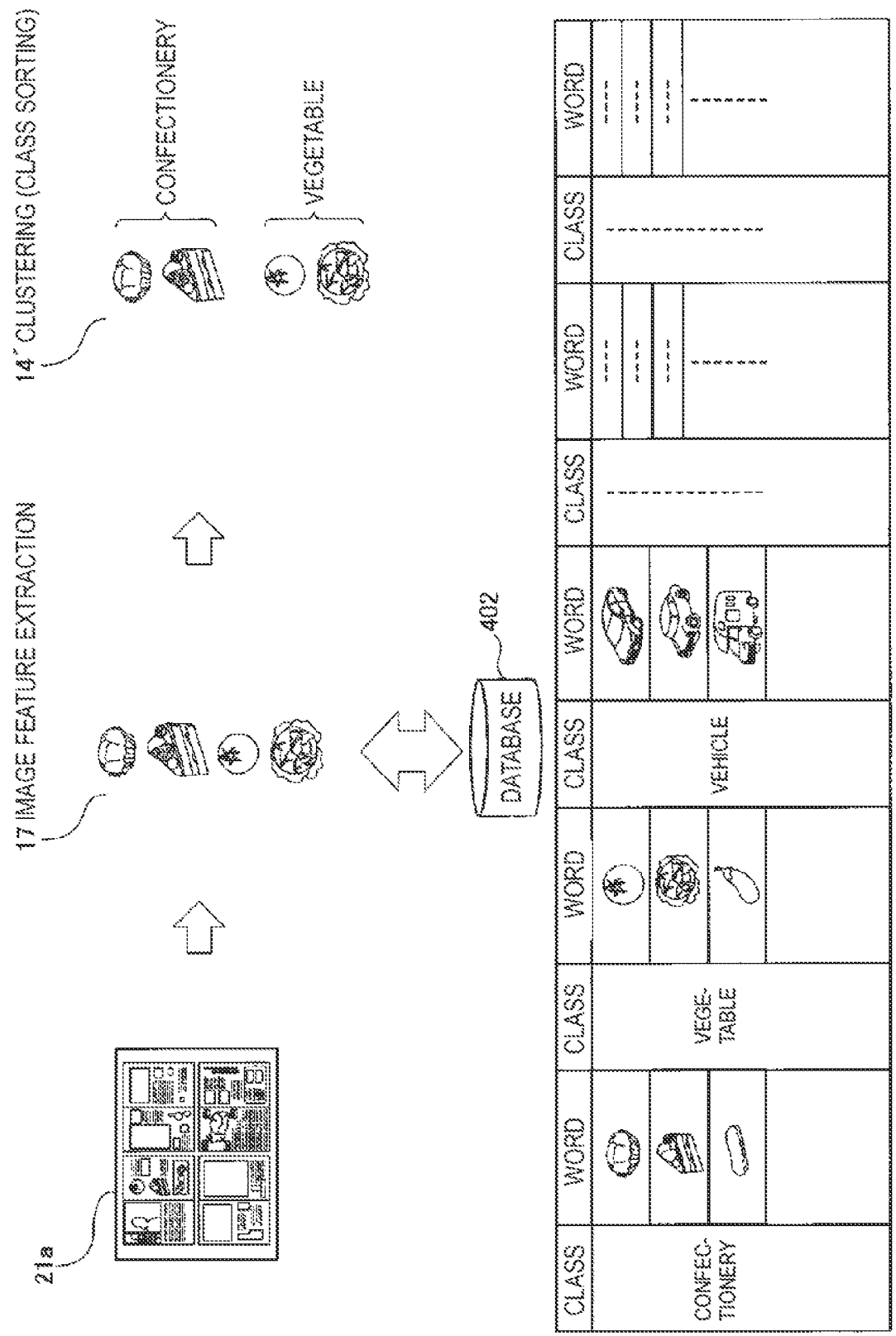
FIG. 11 is an explanatory drawing of illustrating clustering processing according to variation 1.

Word extraction processing on the captured image and the clustering processing is performed, for example, as illustrated in FIG. 11.

Suppose that the user captures imagery of an information magazine in which images of confectionery and vegetables of its interest are presented using the camera-equipped terminal apparatus 200. At this stage, images of confectionery and vegetables are extracted from the captured image 21*a* in the image feature extraction processing 17.

Furthermore, by performing clustering processing 14', the individual images thus extracted are sorted into class confectionery and class vegetable.

When the camera-equipped terminal apparatus 200 performs the clustering processing 14', the camera-equipped terminal apparatus 200 performs, for example, communication with the server 400 illustrated in FIG. 1 to use a database 402 regarding clustering on the images included in the server 400. Namely, the database 402 prepared in the server 400 includes information of images corresponding to various words and classes to which the words belong. For example, the database 402 illustrated in FIG. 11 includes information of words which belong to each class of various classes such as "confectionery", "vegetable" and "vehicle". In addition, feature amounts of individual words included in the information of the database 402 are considered to include various feature amounts such as color features such as color histograms, luminance features, texture features and edge features. By performing comparison of such various feature amounts, processing of recognizing object bodies in a captured image can be performed precisely.

By performing the pieces of processing described with reference to FIG. 9 to FIG. 11, the video recording apparatus 100 can retrieve video content on the basis of word information extracted from the content of an image captured by the camera-equipped terminal apparatus 200. Therefore, the user capturing imagery of magazines, catalogs, brochures and the like in which items of the user's interest are described enables to retrieve the video content in which the object body in the same class as that of the object body obtained by the capturing appears.

Moreover, the target whose imagery the camera-equipped terminal apparatus 200 captures for detecting word information from the content of the image is not limited to printed matter such as magazines, but the user may captures, for example, imagery of confectionery actually presented in a confectionery. Or, imagery of a television broadcasting screen or the like displayed by the display apparatus 300 may also be captured. Thus, word information can be extracted from the content of various captured images.

[6. Variation 2]

Next, a variation according to the embodiment of the present disclosure (part 2) is described with reference to FIG. 12 to FIG. 13.

This example is a combination of the processing, described with reference to FIG. 4 and the like, of detecting characters contained in a captured image captured by the camera-equipped terminal apparatus 200 using the character recognition and the processing, described with reference to FIG. 9 and the like, of performing the image recognition on the content of a captured image captured by the camera-equipped terminal apparatus 200.

Figure 12:
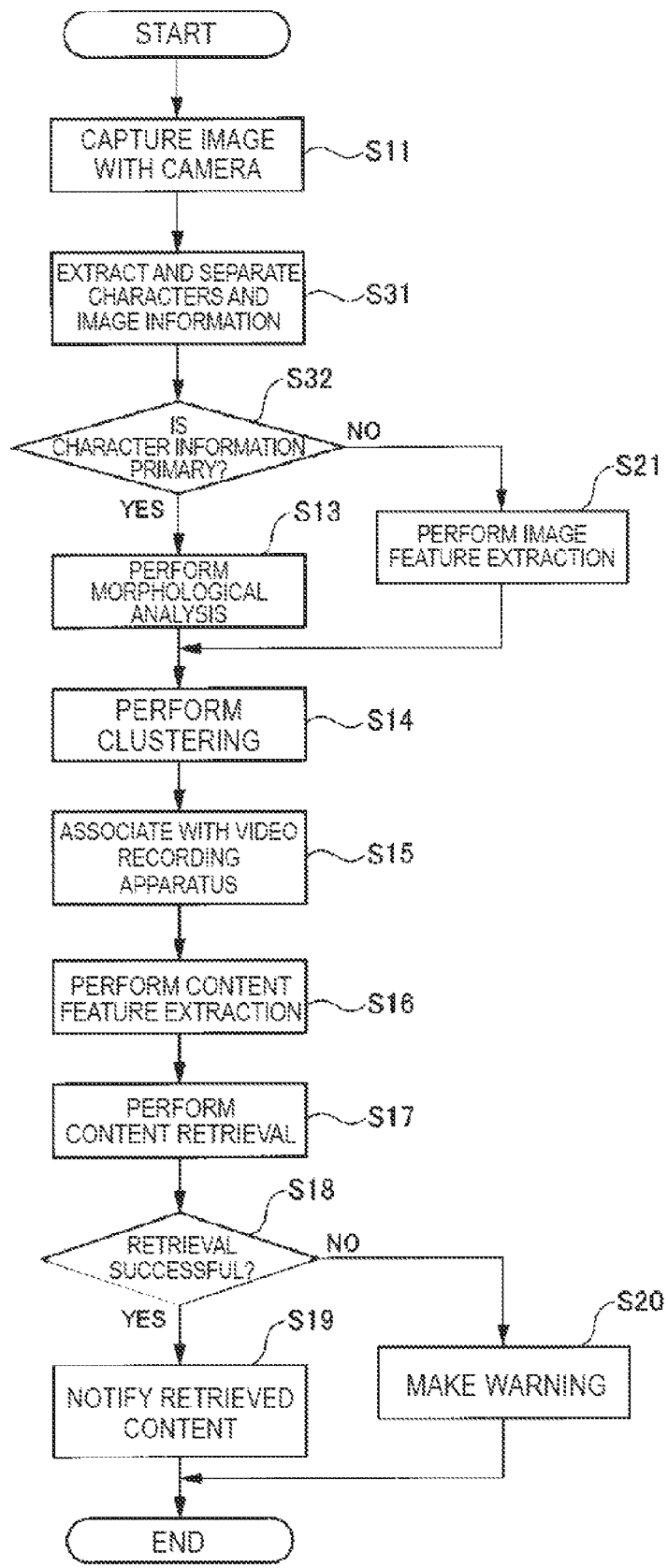
FIG. 12 is a flowchart illustrating variation 2 according to the embodiment of the present disclosure (example of selecting processing according to an image)

FIG. 12 is a flowchart presenting a processing example in this case. In the flowchart of FIG. 12, the pieces of processing same as in the flowcharts of FIG. 5 and FIG. 10 are provided with the same step numbers and their description is omitted.

Describing the processing in the flowchart of FIG. 12, after acquiring an image captured in step S11, the camera-equipped terminal apparatus 200 performs the character recognition processing of recognizing characters contained in the image and the image recognition processing of recognizing the content of the image (step S31). After that, the camera-equipped terminal apparatus 200 determines whether or not the character information is the primary on the basis of the recognition results (step S32). In the determination, when the image is determined in which the character information is the primary, the camera-equipped terminal apparatus 200 performs the morphological analysis on a character string in the extracted text code and acquires words expected for the content retrieval (step S13).

Moreover, in the determination in step S32, when it is determined that the character information is not the primary but the image information is the primary, the camera-equipped terminal apparatus 200 performs the image feature extraction processing to obtain word information from shapes and the like of object bodies in the image (step S21).

Then, after performing the morphological analysis processing in step S13 or the image feature extraction processing in step S21, the camera-equipped terminal apparatus 200 performs the clustering processing on the extracted words (step S14). After performing the clustering processing, the processing same as in the flowchart of FIG. 5 is performed.

Figure 13:
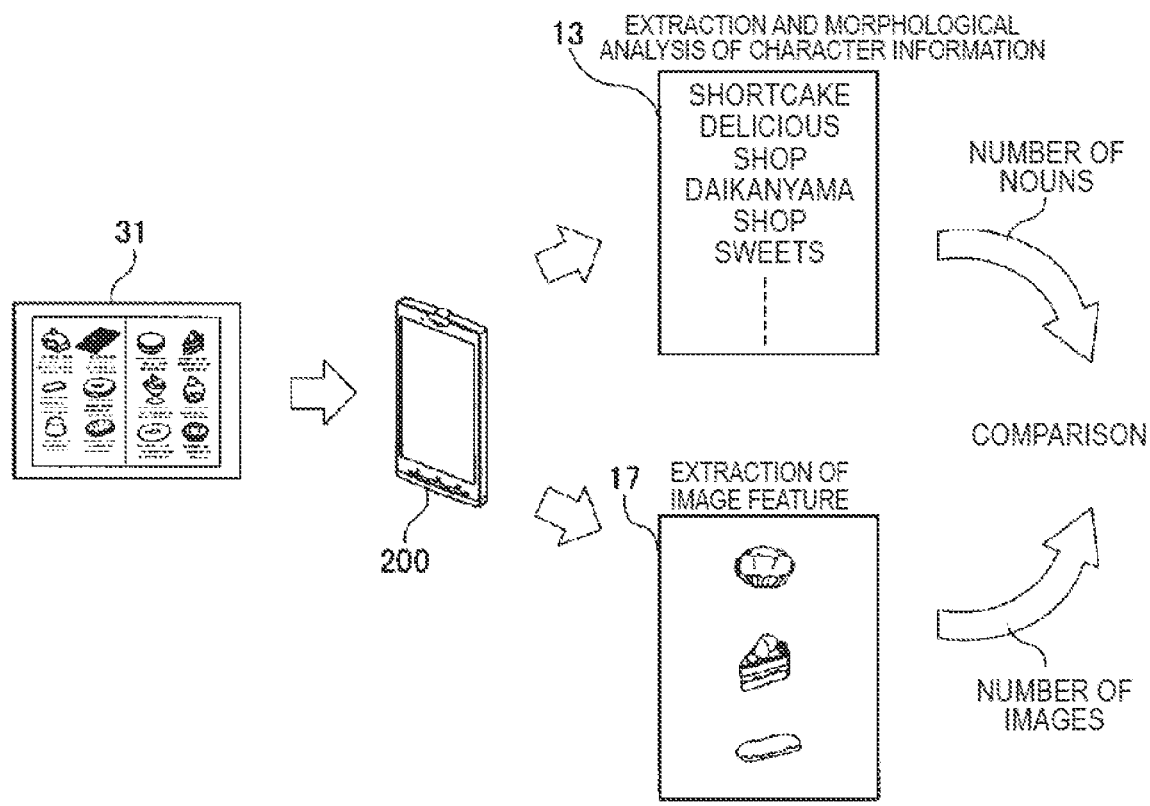
FIG. 13 is an explanatory drawing of illustrating an example of comparison processing according to variation 2.

The processing of determining whether or not the character information is the primary in step S32 in the flowchart of FIG. 12 is performed, for example, as illustrated in FIG. 13. Namely, when the camera-equipped terminal apparatus 200 captures an image 31, the camera-equipped terminal apparatus 200 compares the number of nouns which are acquired using the morphological analysis on characters contained in the image 31 with the number of individual images contained in the image 31. Herein, the individual images are images for which nouns are detected using the image recognition such as images of "confectionery" as illustrated in FIG. 13.

Then, the camera-equipped terminal apparatus 200 determines one having larger number as the primary information and performs the clustering processing on the character information, which is the primary, to obtain the word information which is transmitted to the video recording apparatus 100.

Thus, the camera-equipped terminal apparatus 200 determines whether or not character information in a captured image is primary, and switches processing. Thereby, the effect is attained that any of captured images with more characters and with less characters can be handled.

In addition, in the flowchart of FIG. 12, the camera-equipped terminal apparatus 200 obtains the word information from the information which is determined as being the primary. On the contrary, the camera-equipped terminal apparatus 200 may also use both of the words obtained using the morphological analysis on characters contained in the image 31 and the words obtained by recognizing individual images contained in the image 31 as the word information for retrieving video content.

[7. Other Variations]

In addition, in the above-mentioned examples according to the embodiment, the camera-equipped terminal apparatus 200 acquires the word information using the character recognition or the image recognition on the captured image to transmit the word information to the video recording apparatus 100. On the contrary, the camera-equipped terminal apparatus 200 may send, for example, the captured image to the video recording apparatus 100 and the video recording apparatus 100 may perform the character recognition or the image recognition on the image. Or, the image captured by the camera-equipped terminal apparatus 200 may be sent to the server 400 and the server 400 may acquire the word information using the character recognition or the image recognition. Any of the apparatuses 100, 200 and 400 may perform the clustering processing of classifying the word information.

Moreover, an external apparatus other than the video recording apparatus 100 or the server 400 connected to the Internet may perform the image/voice feature extraction processing 15 (FIG. 4 or the like) on the video content accumulated in the video recording apparatus 100.

Moreover, in the above-mentioned examples according to the embodiment, the video recording apparatus 100 is an apparatus receiving and accumulating broadcasting signals. On the contrary, the processing according to the embodiment of the present disclosure may be applied to any other recording apparatus which can accumulate video content.

Moreover, the camera-equipped terminal apparatus 200 is an example of application to a mobile phone terminal device called smart phone. On the contrary, the processing according to the embodiment of the present disclosure may be applied to any other terminal device only if it is a camera-equipped terminal device.

Moreover, the system illustrated in FIG. 1 is a system including two apparatuses of the camera-equipped terminal apparatus 200 and the video recording apparatus 100. On the contrary, when the camera-equipped terminal apparatus 200 has a function of accumulating television broadcasting and/or downloaded video content, the camera-equipped terminal apparatus 200 may perform all the pieces of processing from the image capturing to the retrieval of video content.

Moreover, the processing of determining the similarity described in the above-mentioned examples according to the embodiment is one example and the video recording apparatus 100 may determine the similarity in any other piece of processing. For example, in the above-mentioned examples according to the embodiment, the video recording apparatus 100 compares the frequencies of appearance of words which frequencies are for individual classes. On the contrary, the video recording apparatus 100 may perform the classification in a plurality of levels to determine the similarity more precisely. Specifically, for example, preparing top level classes (for example, "food"), lower level classes under the classes (for example, "confectionery") and further lower level classes under the classes (for example, "western confectionery") as classes, an item with high similarity at a lower level is considered as an item with higher similarity when the video recording apparatus 100 determines the similarity.

Moreover, when the similarity is determined, other factors other than the frequencies of appearance of words which frequencies are for individual classes may be used for the determination of the similarity.

Or, the video recording apparatus 100 may retrieve relevant video content from the accumulated video content in other determination processing based on the word information obtained from the captured image and the word information obtained from the accumulated video content.

Moreover, when the video recording apparatus 100 obtains word information from video content, words in a class which the user seems to prefer may be preferentially retrieved, reflecting previous usage of the video recording apparatus 100 by the user. Also when the camera-equipped terminal apparatus 200 obtains word information from images, classification may be performed, similarly reflecting previous usage thereof by the user.

Moreover, in the above-mentioned examples according to the embodiment, the video recording apparatus 100 and the camera-equipped terminal apparatus 200 performing the processing are described exemplarily. On the contrary, a computer apparatus performing various kinds of data processing may be, for example, implemented with a program (software) for performing the processing procedures according to the embodiment of the present disclosure, and the computer apparatus may perform the analysis of images and/or the retrieval of accumulated video content. The program may be, for example, prepared by being stored in various kinds of recording media.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A video recording apparatus including:
 a content accumulation part accumulating video content;
 a feature extraction processing part extracting an image or voice as a feature from the video content accumulated by the content accumulation part, and obtaining word information from the extracted image or the extracted voice;
 a word information acquisition part acquiring sorted word information obtained using clustering processing on word information identified from an image captured by a camera; and
 a content retrieval part retrieving relevant video content from the video content accumulated by the content accumulation part based on the sorted word information acquired by the word information acquisition part and the word information acquired by the feature extraction processing part.

(2) The video recording apparatus according to (1),
 wherein the feature extraction processing part acquires the word information from a subtitle or a telop contained in an image of the video content.

(3) The video recording apparatus according to (1) or (2),
 wherein the feature extraction processing part acquires the word information further from text information contained in additional information of the video content.

(4) The video recording apparatus according to any one of (1) to (3),
 wherein the word information acquisition part acquires the sorted word information obtained using the clustering processing on word information acquired by character recognition processing on the image captured by the camera.

(5) The video recording apparatus according to any one of (1) to (3),
 wherein the word information acquisition part acquires the word information as a name of an object body from a shape of the object body in the image captured by the camera.

(6) The video recording apparatus according to any one of (1) to (3),
 wherein the word information acquired by the word information acquisition part is word information determined as primary information by comparing a number of words obtained using character recognition processing on the image captured by the camera with a number of object bodies recognized based on a shape in the image captured by the camera.

(7) An information processing system including:
 a camera-equipped terminal apparatus having a camera part; and
 a video recording apparatus communicative with the camera-equipped terminal apparatus and having a content accumulation part accumulating video content,
 wherein any one of the camera-equipped terminal apparatus and the video recording apparatus includes:
  an image recognition part obtaining word information from an image captured by the camera part of the camera-equipped terminal apparatus;
  a clustering processing part obtaining sorted word information by clustering the word information obtained by the image recognition part;
  a feature extraction processing part extracting an image or voice as a feature from the video content accumulated by the content accumulation part, and obtaining word information from the extracted image or the extracted voice; and
  a content retrieval part retrieving relevant video content from the video content accumulated by the content accumulation part based on the sorted word information obtained by the clustering processing part and the word information obtained by the feature extraction processing part.

(8) An information processing method including:
 feature extraction processing of extracting an image or voice as a feature from video content accumulated by a content accumulation part, and obtaining word information from the extracted image or the extracted voice;
 image recognition processing of obtaining word information from an image captured by a camera;
 clustering processing of obtaining sorted word information by clustering the word information obtained using the image recognition processing; and
 content retrieval processing of retrieving relevant video content from the video content accumulated by the content accumulation part based on the sorted word information obtained using the clustering processing and the word information obtained using the feature extraction processing.

(9) A recording medium in which a program is recorded for causing a computer to execute:
 a feature extraction procedure of extracting an image or voice as a feature from video content accumulated by a content accumulation part, and obtaining word information from the extracted image or the extracted voice;
 an image recognition procedure of obtaining word information from an image captured by a camera;
 a clustering procedure of obtaining sorted word information by clustering the word information obtained using the image recognition procedure; and
 a content retrieval procedure of retrieving relevant video content from the video content accumulated by the content accumulation part based on the sorted word information obtained using the clustering procedure and the word information obtained using the feature extraction procedure.

What is claimed is:

1. A video recording apparatus comprising:
a content accumulation part accumulating video content;
a feature extraction processing part extracting an image or voice as a feature from the video content accumulated by the content accumulation part, and obtaining word information from the extracted image or the extracted voice;
a word information acquisition part acquiring sorted word information obtained using clustering processing on word information identified from an image captured by a camera; and
a content retrieval part retrieving relevant video content from the video content accumulated by the content accumulation part based on a similarity determination involving word comparison involving the sorted word information acquired by the word information acquisition part and the word information acquired by the feature extraction processing part,
the word information obtained from the feature extraction processing part includes information of a number of words and information regarding a class associated with each word within a hierarchical class arrangement, in which a lower class word is assigned a higher weight than a higher class word, so that in the word comparison of the similarity determination performed by the content retrieval part a successful word comparison involving a respective low class word is considered as having a higher similarity as compared to a successful word comparison involving a respective high class word.

2. The video recording apparatus according to claim 1, wherein the feature extraction processing part acquires the word information from a subtitle or a telop contained in an image of the video content.

3. The video recording apparatus according to claim 2, wherein the feature extraction processing part acquires the word information further from text information contained in additional information of the video content.

4. The video recording apparatus according to claim 1, wherein the word information acquisition part acquires the sorted word information obtained using the clustering processing on word information acquired by character recognition processing on the image captured by the camera.

5. The video recording apparatus according to claim 1, wherein the word information acquisition part acquires the word information as a name of an object body from a shape of the object body in the image captured by the camera.

6. A video recording apparatus comprising:
a content accumulation part accumulating video content;
a feature extraction processing part extracting an image or voice as a feature from the video content accumulated by the content accumulation part, and obtaining word information from the extracted image or the extracted voice;
a word information acquisition part acquiring sorted word information obtained using clustering processing on word information identified from an image captured by a camera; and
a content retrieval part retrieving relevant video content from the video content accumulated by the content accumulation part based on the sorted word information acquired by the word information acquisition part and the word information acquired by the feature extraction processing part,
wherein the word information acquired by the word information acquisition part is word information determined as primary information by comparing a number of words obtained using character recognition processing on the image captured by the camera with a number of object bodies recognized based on a shape in the image captured by the camera.

7. An information processing system comprising:
a camera-equipped terminal apparatus having a camera part; and
a video recording apparatus communicative with the camera-equipped terminal apparatus and having a content accumulation part accumulating video content,
wherein any one of the camera-equipped terminal apparatus and the video recording apparatus includes:
an image recognition part obtaining word information from an image captured by the camera part of the camera-equipped terminal apparatus;
a clustering processing part obtaining sorted word information by clustering the word information obtained by the image recognition part;
a feature extraction processing part extracting an image or voice as a feature from the video content accumulated by the content accumulation part, and obtaining word information from the extracted image or the extracted voice; and
a content retrieval part retrieving relevant video content from the video content accumulated by the content accumulation part based on a similarity determination involving word comparison involving the sorted word information obtained by the clustering processing part and the word information obtained by the feature extraction processing part,
the word information obtained from the feature extraction processing part includes information of a number of words and information regarding a class associated with each word within a hierarchical class arrangement, in which a lower class word is assigned a higher weight than a higher class word, so that in the word comparison of the similarity determination performed by the content retrieval part a successful word comparison involving a respective low class word is considered as having a higher similarity as compared to a successful word comparison involving a respective high class word.

8. An information processing method comprising:
feature extraction processing of extracting an image or voice as a feature from video content accumulated by a content accumulation part, and obtaining word information from the extracted image or the extracted voice;
image recognition processing of obtaining word information from an image captured by a camera;
clustering processing of obtaining sorted word information by clustering the word information obtained using the image recognition processing; and
content retrieval processing of retrieving relevant video content from the video content accumulated by the content accumulation part based on a similarity determination involving word comparison involving the sorted word information obtained using the clustering processing and the word information obtained using the feature extraction processing,
the word information obtained from the feature extraction processing includes information of a number of words and information regarding a class associated with each word within a hierarchical class arrangement, in which a lower class word is assigned a higher weight than a higher class word, so that in the word comparison of the similarity determination a successful word comparison involving a respective low class word is considered as having a higher similarity as compared to a successful word comparison involving a respective high class word.

9. A non-transitory computer readable recording medium having a program recorded thereon for causing a computer to execute:

a feature extraction procedure of extracting an image or voice as a feature from video content accumulated by a content accumulation part, and obtaining word information from the extracted image or the extracted voice;

an image recognition procedure of obtaining word information from an image captured by a camera;

a clustering procedure of obtaining sorted word information by clustering the word information obtained using the image recognition procedure; and a content retrieval procedure of retrieving relevant video content from the video content accumulated by the content accumulation part based on a similarity determination involving word comparison involving the sorted word information obtained using the clustering procedure and the word information obtained using the feature extraction procedure, the word information obtained from the feature extraction procedure includes information of a number of words and information regarding a class associated with each word within a hierarchical class arrangement, in which a lower class word is assigned a higher weight than a higher class word, so that in the word comparison of the similarity determination a successful word comparison involving a respective low class word is considered as having a higher similarity as compared to a successful word comparison involving a respective high class word.

\* \* \* \* \*